United States Patent [19]
Tochiyama

[11] Patent Number: 5,841,609
[45] Date of Patent: Nov. 24, 1998

[54] ASSEMBLY CONNECTING SUSPENSION TO ACTUATOR ARM UTILIZING ADHESIVE INJECTING HOLE

[75] Inventor: Kazunori Tochiyama, Kawasaki, Japan

[73] Assignee: Fujitsu Limited, Kawasaki, Japan

[21] Appl. No.: 747,305

[22] Filed: Nov. 12, 1996

[30] Foreign Application Priority Data

Jun. 17, 1996 [JP] Japan ................................. 8-155169

[51] Int. Cl.⁶ .............................. G11B 5/48; G11B 21/16
[52] U.S. Cl. ............................................................ 360/104
[58] Field of Search ..................................... 360/104, 106

[56] References Cited

U.S. PATENT DOCUMENTS

| | | | |
|---|---|---|---|
| 5,172,286 | 12/1992 | Jurgenson | 360/104 |
| 5,225,949 | 7/1993 | King et al. | 360/104 |

FOREIGN PATENT DOCUMENTS

| | | | |
|---|---|---|---|
| 04-360081 | 12/1992 | Japan | 360/104 |
| 05-120820 | 5/1993 | Japan | 360/104 |
| 05-307842 | 11/1993 | Japan | 360/104 |
| 06-259907 | 9/1994 | Japan . | |
| 08-045040 | 2/1996 | Japan . | |
| 08-096332 | 4/1996 | Japan . | |

OTHER PUBLICATIONS

"Magnetic Disk Device", Sato, Patent Abstracts of Japan, p. 1287, vol. 15, No. 492, 03–212867, 12 Dec. 1991.
"Magnetic Disk Device", Hosokawa et al., Patent Abstracts of Japan, p. 1669, vol. 18, No. 5, 05–242615, 7 Jan. 1994.

*Primary Examiner*—Craig A.. Renner
*Attorney, Agent, or Firm*—Greer, Burns & Crain, Ltd.

[57] ABSTRACT

An apparatus for fixing a suspension to an actuator arm has a mounting portion. The mounting portion has a first hole for fixing the suspension and a second hole for injecting an adhesive. The second hole is substantially perpendicular to the first hole and communicates with the first hole. A spacer having a cylindrical projection having an outer diameter slightly smaller than the diameter of the first hole is spot-welded to a base end portion of the suspension. The cylindrical projection of the spacer fixed to the suspension is inserted into the first hole of the mounting portion of the actuator arm, and the adhesive is next injected through the second hole into the first hole, thereby fixing the suspension to the mounting portion of the actuator arm by means of the adhesive injected.

3 Claims, 14 Drawing Sheets

ASSEMBLY CONNECTING SUSPENSION TO ACTUATOR ARM UTILIZING ADHESIVE INJECTING HOLE

BACKGROUND OF THE INVENTION

1. Field of the Invention

The present invention relates to a method of fixing a suspension to an actuator arm in a disk drive, and also to an actuator arm assembly manufactured by using the fixing method.

2. Description of the Related Art

In a recent magnetic disk drive as a kind of external storage device for a computer, size reduction and thickness reduction have proceeded, and low power consumption has also been desired. Further, to increase the storage capacity, an increase in recording density of a magnetic disk (hard disk) is required and the number of magnetic disks mounted in the disk drive is also increasing.

In a magnetic disk drive for a computer, a contact start and stop (CSS) system is generally adopted as the relation between a magnetic head and a magnetic disk. In this system, the magnetic head flies at a microscopic height from the magnetic disk during rotation of the disk owing to the balance between a flying forces generated by air flow due to high-speed rotation of the disk and a pressing force of a suspension for pressing the head on the disk. When the rotation of the disk is stopped, the head is moved to a contactable zone on the disk and comes into contact with the disk at the contactable zone. In the rest condition of the disk, the head is kept in contact with the disk.

The magnetic head is supported by the suspension at its front end. The suspension is fixed at its base end portion through a spacer to the front end of an actuator arm. That is, the base end portion of the suspension is spot-welded to the spacer, and the spacer is fixed by crimping to the front end of the actuator arm, thereby fixing the suspension to the front end of the actuator arm. As a method of fixing the spacer to the front end of the actuator arm by crimping, it is known to pass a crimping ball through a cylindrical projection formed on the spacer to thereby expand the cylindrical projection, thus crimping the spacer to a hole of the actuator arm. In carrying out this crimping work, the spacer is pressed by a jig to prevent deformation of the spacer surface due to a crimping force.

However, in such a conventional method of fixing the spacer by crimping, there is a tendency that the spacer is recessed on the upstream side (upper side) in the direction of passing of the crimping ball and is projected on the downstream side (lower side) in this direction. As a result, twist or warpage of the spacer is apt to occur, causing an adverse effect on flying characteristics of the head. Such an uneven surface of the spacer causes variations in connecting force between the suspension and the actuator arm, which causes possible fluctuations in vibration characteristics of the suspension. Further, during passing of the crimping ball through the cylindrical projection of the spacer, the inner circumferential surface of the cylindrical projection is usually cut by friction between the ball and the cylindrical projection. As a result, shavings remain in the cylindrical projection of the spacer, and thereafter come out to possibly contaminate the interior of the disk drive.

SUMMARY OF THE INVENTION

It is therefore an object of the present invention to provide a method of fixing a suspension to an actuator arm which can securely fix the suspension by adhesion.

In accordance with an aspect of the present invention, there is provided a method of fixing a suspension to an actuator arm, comprising the steps of preparing a mounting portion of the actuator arm, the mounting portion having a first hole for fixing the suspension and a second hole for injecting an adhesive, the second hole being substantially perpendicular to the first hole and communicating with the first hole; fixing a spacer to a base end portion of the suspension, the spacer having a flat plate portion and a cylindrical projection insertable into the first hole; inserting the cylindrical projection of the spacer fixed to the suspension into the first hole of the mounting portion of th(e actuator arm; and injecting the adhesive through the second hole of the mounting portion of the actuator arm into the first hole to fix the suspension to the mounting portion of the actuator arm by means of the adhesive injected.

Preferably, the cylindrical projection of the spacer has at least one annular groove. When the adhesive is injected through the second hole formed in the mounting portion of the actuator arm, the adhesive injected is stored in the annular groove of the cylindrical projection, so that the suspension can be more securely fixed to the mounting portion of the actuator arm by means of the adhesive injected.

In accordance with another aspect of the present invention, there is provided an actuator arm assembly of a disk drive having a base, comprising an actuator arm rotatably mounted on the base, the actuator arm having one end portion formed with a first hole and a second hole substantially perpendicular to the first hole and communicating with the first hole; a suspension having one end portion for supporting a head; and a spacer fixed to the other end portion of the suspension, the spacer having a cylindrical projection inserted in the first hole and fixed to the one end portion of the actuator arm by means of an adhesive injected through the second hole into the first hole.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
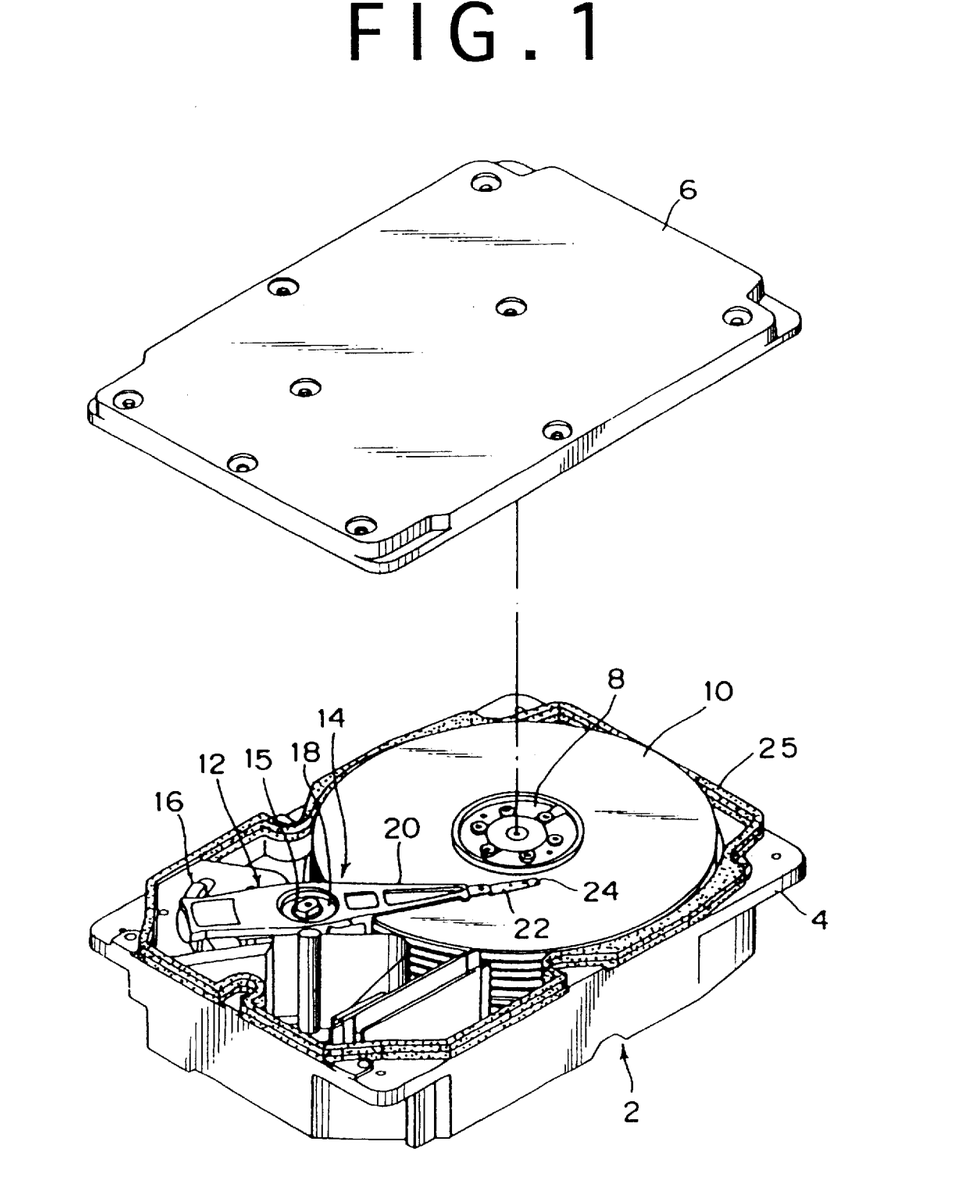
FIG. 1 is a perspective view of a magnetic disk drive employing the actuator arm assembly of the present invention.

Referring to FIG. 1, there is shown a perspective view of a magnetic disk drive employing the actuator arm assembly of the present invention. Reference numeral 2 denotes a housing (disk enclosure) composed of a base 4 and a cover 6. A spindle hub (not shown) to be rotatably driven by an inner hub motor (not shown) is provided on the base 4. A plurality of magnetic disks 10 and spacers (not shown) are alternately stacked and mounted on the spindle hub. That is, the plurality of magnetic disks 10 are regularly spaced from each other by the spacers and are fixedly mounted on the spindle hub by securing a disk clamp 8 to the spindle hub by means of screws.

Reference numeral 12 denotes a rotary actuator assembly composed of an actuator arm assembly 14 and a magnetic circuit 16. The actuator arm assembly 14 includes an actuator block 18 rotatably mounted on a shaft 15 fixed to the base 4. The actuator block 18 is integrally formed with a plurality of actuator arms 20. A suspension 22 is fixed at its base end portion to a front end portion of each actuator arm 20 by a method to be hereinafter described, and a magnetic head 24 is mounted on a front end portion of each suspension 22. Reference numeral 25 denotes an annular packing for sealing the housing of the magnetic disk drive.

A fixing method for the suspension according to a first preferred embodiment of the present invention will now be described with reference to FIGS. 2 and 3. The actuator arm 20 has at its front end a mounting portion 26 for mounting the suspension 22. The mounting portion 26 of the actuator arm 20 is formed with a hole 28 for fixing the suspension 22 and a hole 30 for injecting an adhesive. The hole 30 is substantially perpendicular to the hole 28 and communicates with the hole 28. The actuator arm 20 is formed of aluminum or aluminum alloy. The suspension 22 is formed of stainless steel. The suspension 22 has at its front end portion an integrally formed flexure 23. The magnetic head 24 is fixed to the upper surface of the flexure 23 by adhesion or the like.

Figure 3:
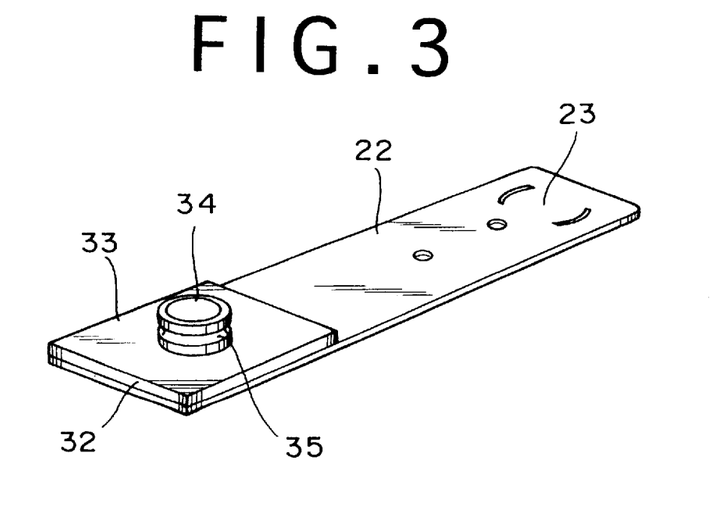
FIG. 3 is a perspective view of a suspension assembly in the first preferred embodiment.

As shown in FIG. 3, a spacer 32 is spot-welded to the base end portion of the suspension 22, thus forming a suspension assembly. The spacer 32 has a flat plate portion 33 and a hollow cylindrical projection 34, which are formed integrally with each other from stainless steel. An annular groove 35 is formed on the outer circumferential surface of the cylindrical projection 34. The hole 28 of the mounting portion 26 of the actuator arm 20 has a diameter of 2 mm, for example. In this case, the cylindrical projection 34 of the spacer 32 has an outer diameter of 1.8 to 1.9 mm.

Figure 2:
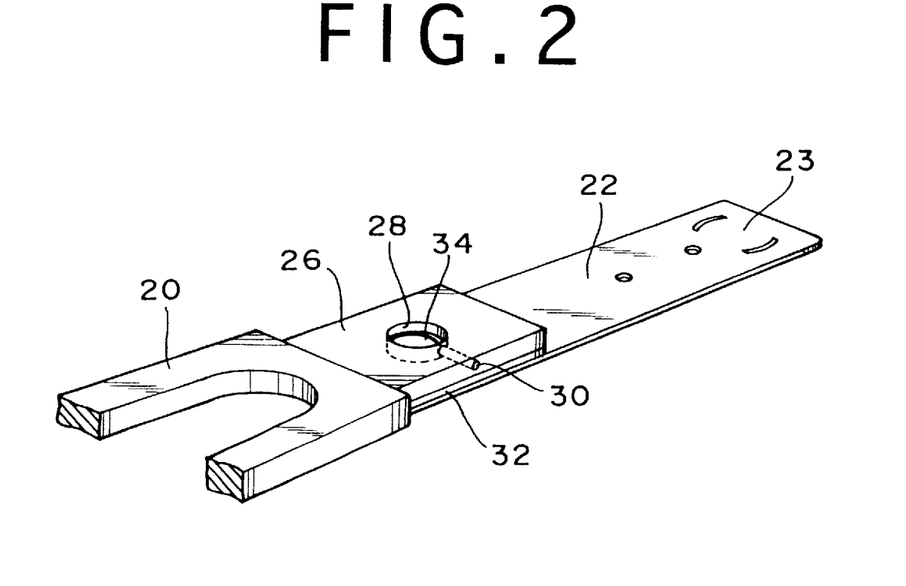
FIG. 2 is a perspective view of a first preferred embodiment of the present invention.

As shown in FIG. 2, the cylindrical projection 34 of the spacer 32 is inserted into the suspension fixing hole 28 of the mounting portion 26 of the actuator arm 20. In this condition, the annular groove 35 formed on the outer circumferential surface of the cylindrical projection 34 communicates with the adhesive injecting hole 30 of the mounting portion 26 of the actuator arm 20. In this condition, the adhesive is injected through the hole 30 into the annular groove 35 formed on the outer circumferential surface of the cylindrical projection 34. Accordingly, the annular groove 35 is filled with the adhesive injected, thereby securely fixing the cylindrical projection 34 to the mounting portion 26 of the actuator arm 20 by means of the adhesive injected.

Even if the cylindrical project 34 does not have the annular groove 35, the adhesive injected through the hole 30 may be spread over an annular gap defined between the outer circumferential surface of the cylindrical projection 34 and a wall surface defining the hole 28, thereby fixing the cylindrical projection 34 to the mounting portion 26 of the actuator arm 20 by means of the adhesive injected. However, by forming the annular groove 35 on the outer circumferential surface of the cylindrical projection 34, the adhesive injected can be stored in the annular groove 35. Accordingly, the cylindrical projection 34 can be more securely fixed to the mounting portion 26 of the actuator arm 20 by means of the adhesive injected.

Figure 4A:
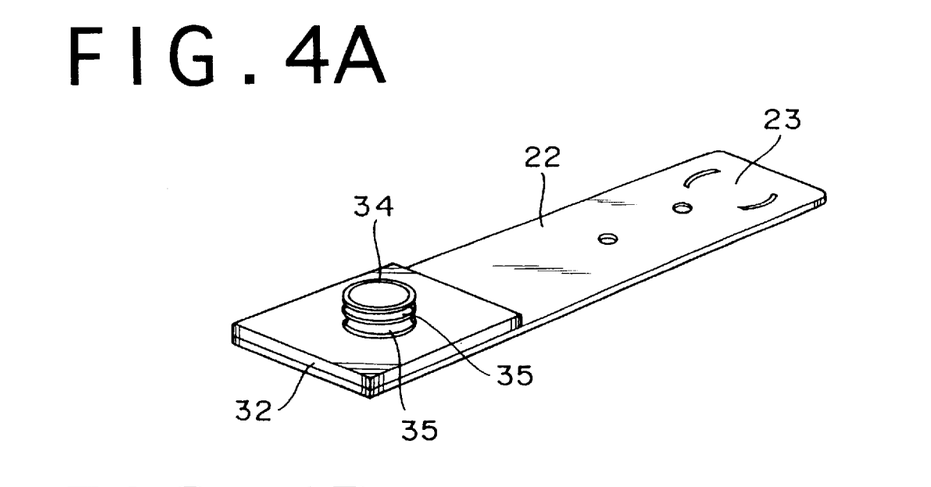
FIGS. 4A to 4C are perspective views of various modifications of the suspension assembly.
Figure 4B:
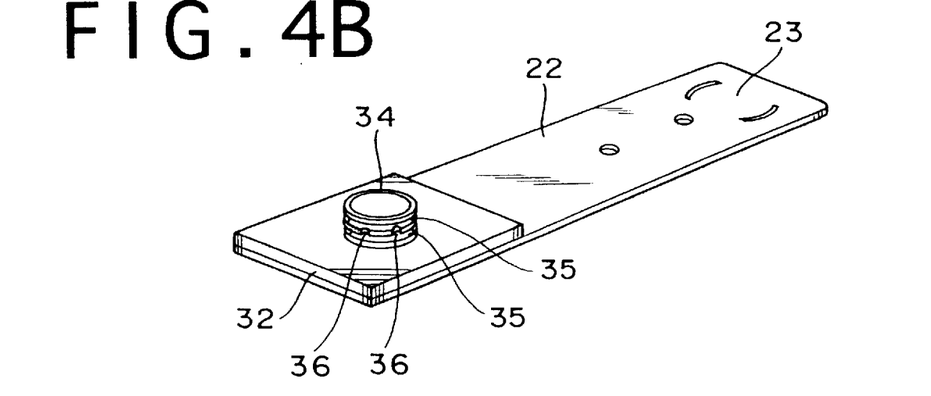
Figure 4C:
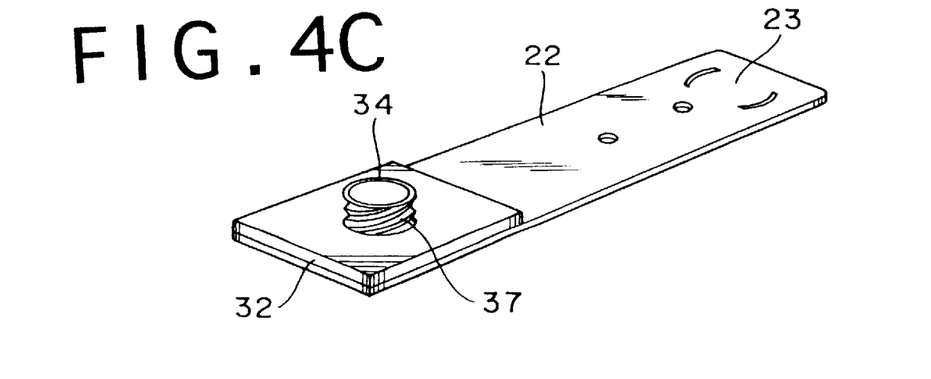

FIGS. 4A to 4C show other preferred embodiments of the suspension assembly. In the suspension assembly shown in FIG. 4A, the cylindrical projection 34 of the spacer 32 has a plurality of annular grooves 35. In the suspension assembly shown in FIG. 4B, the cylindrical projection 34 has a plurality of annular grooves 35 communicating with each other through vertical grooves 36. In the suspension assembly shown in FIG. 4C, a spiral groove 37 is formed on the outer circumferential surface of the cylindrical projection 34.

Figure 5A:
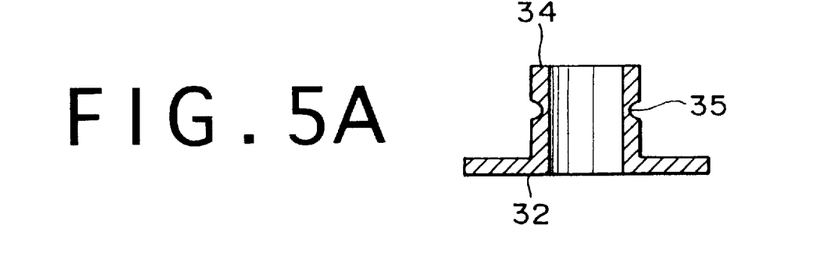
FIGS. 5A to 5C are sectional views showing different sectional shapes of an annular groove of a spacer in the first preferred embodiment.
Figure 5B:
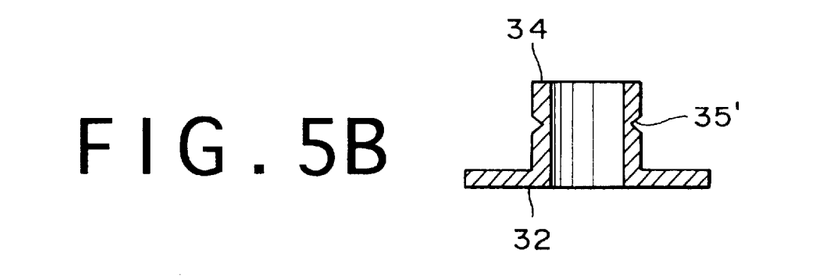
Figure 5C:
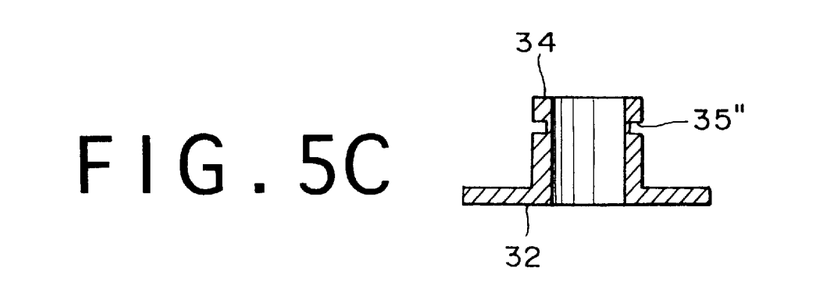
Figure 6A:
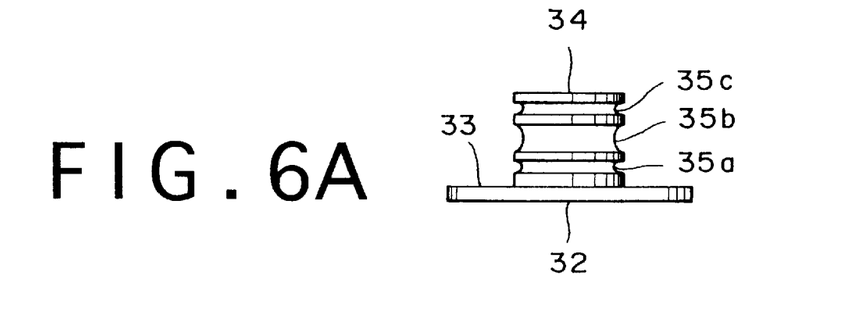
FIGS. 6A and 6B are elevational views showing different shapes of annular grooves of a spacer in the first preferred embodiment.
Figure 6B:
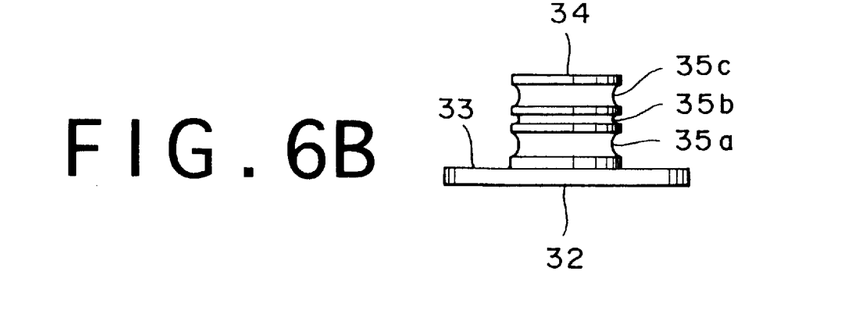

Referring to FIGS. 5A to 5C, there are shown various sectional shapes of the annular groove. FIG. 5A shows an annular groove 35 having a semicircular cross section. FIG. 5B shows an annular groove 35' having a V-shaped cross section. FIG. 5C shows an annular groove 35" having a rectangular cross section.

Referring to FIGS. 6A to 11D, there are shown various shapes of the plural annular grooves formed on the outer circumferential surface of the cylindrical projection 34 of the spacer 32. For convenience of illustration, the cylindrical projection 34 has three annular grooves 35a, 35b, and 35c arranged in this order from the flat plate portion 33 side. In the cylindrical projection 34 shown in FIG. 6A, the width of the intermediate annular groove 35b is larger than the width of each of the opposite annular grooves 35a and 35c. In the cylindrical projection 34 shown in FIG. 6B, the width of the intermediate annular groove 35b is smaller than the width of each of the opposite annular grooves 35a and 35c.

Figure 7A:
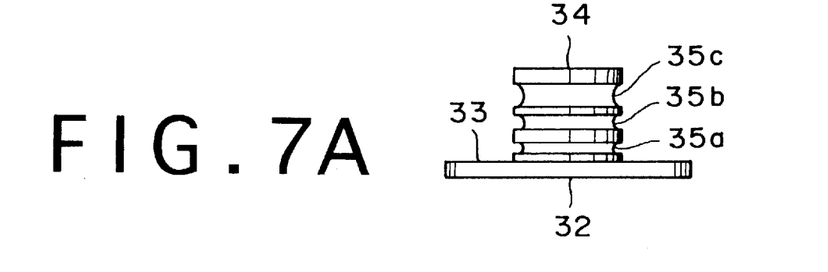
FIGS. 7A to 7C are elevational views showing other different shapes of the annular grooves of the spacer.
Figure 7B:
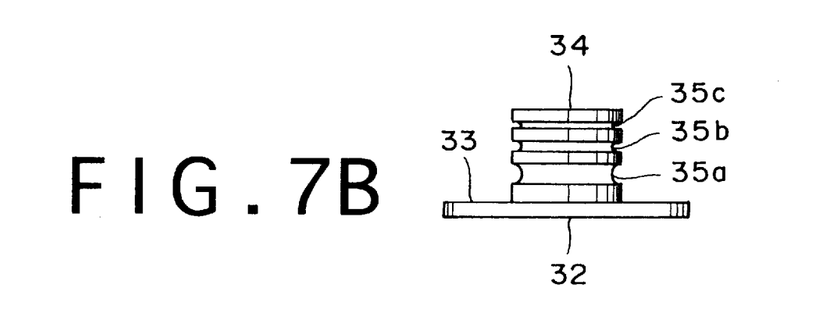
Figure 7C:
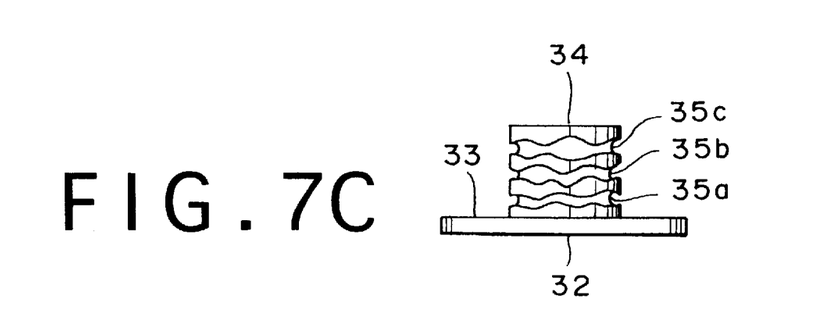

In the cylindrical projection 34 shown in FIG. 7A, the width of the annular groove 35b is larger than the width of the annular groove 35a, and the width of the annular groove 35c is larger than the width of the annular groove 35b. In the cylindrical projection 34 shown in FIG. 7B, the width of the annular groove 35b is smaller than the width of the annular groove 35a, and the width of the annular groove 35c is smaller than the width of the annular groove 35b. In the cylindrical projection 34 shown in FIG. 7C, the width of each of the annular grooves 35a to 35c is not constant in the circumferential direction, that is, each annular groove is widened and narrowed in the circumferential direction.

Figure 8A:
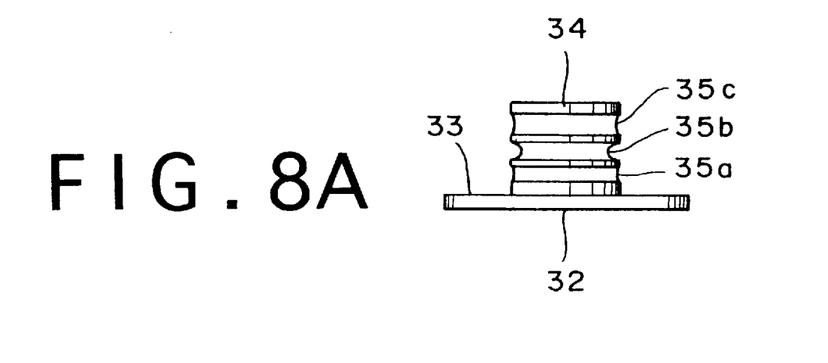
FIGS. 8A and 8B are elevational views showing still other different shapes of the annular grooves of the spacer.
Figure 8B:
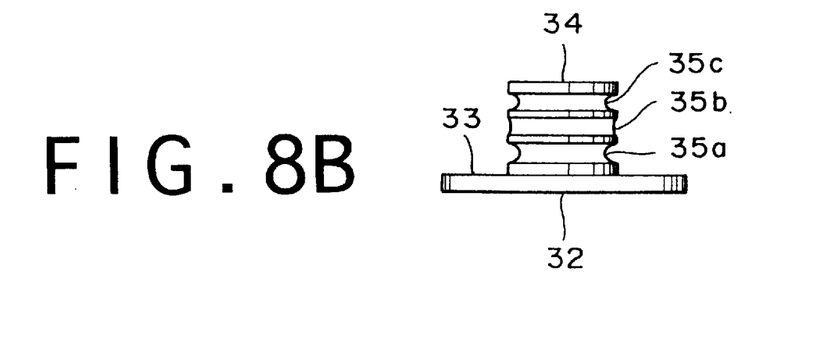

In the cylindrical projection 34 shown in FIG. 8A, the depth of the intermediate annular groove 35b is larger than the depth of each of the opposite annular grooves 35a and 35c. In the cylindrical projection 34 shown in FIG. 8B, the depth of the intermediate annular groove 35b is smaller than the depth of each of the opposite annular grooves 35a and 35c.

Figure 9A:
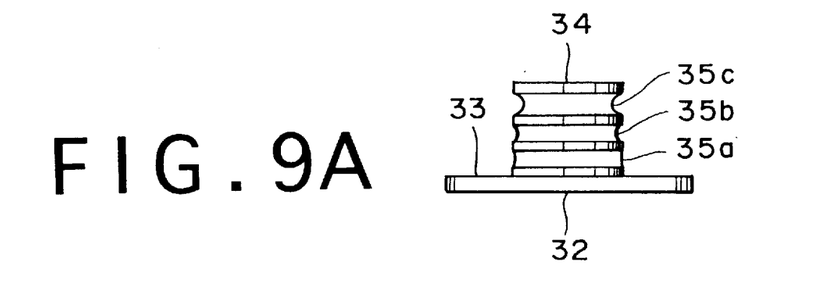
FIGS. 9A to 9C are elevational views showing still other different shapes of the annular grooves of the spacer.
Figure 9B:
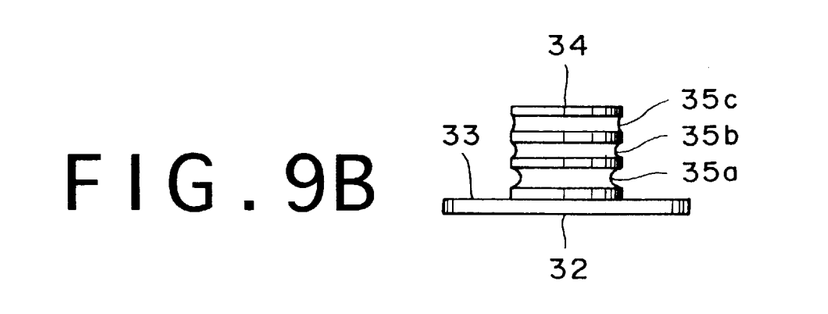
Figure 9C:
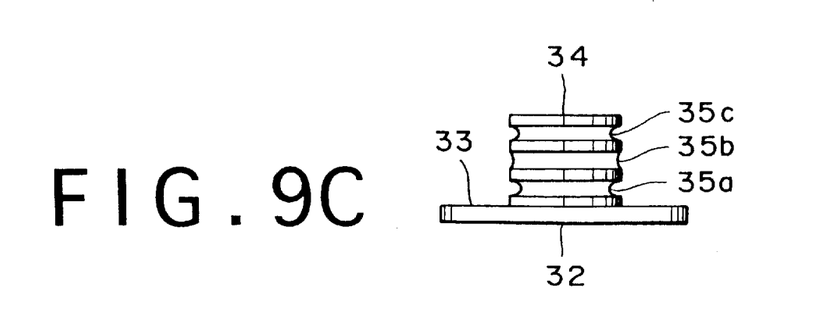

In the cylindrical projection 34 shown in FIG. 9A, the depth of the annular groove 35b is larger than the depth of the annular groove 35a, and the depth of the annular groove 35c is larger than the depth of the annular groove 35b. In the cylindrical projection 34 shown in FIG. 9B, the depth of the annular groove 35b is smaller than the depth of the annular groove 35a, and the depth of the annular groove 35c is smaller than the depth of the annular groove 35b. In the cylindrical projection 34 shown in FIG. 9C, the depth of each of the annular grooves 35a to 35c is varied in the circumferential direction.

Figure 10A:
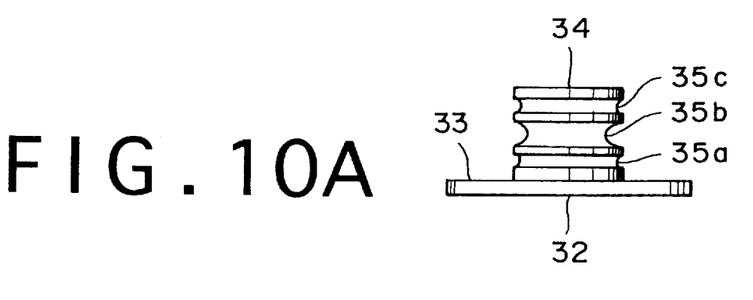
FIGS. 10A and 10B are elevational views showing still other different shapes of the annular grooves of the spacer.
Figure 10B:
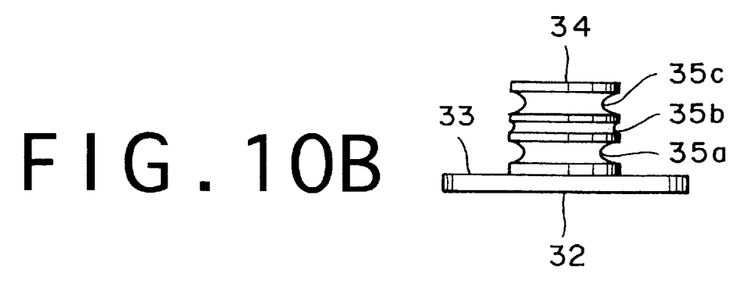

In the cylindrical projection 34 shown in FIG. 10A, the width and depth of the intermediate annular groove 35b are larger than the width and depth of each of the opposite annular grooves 35a and 35c, respectively. In the cylindrical projection 34 shown in FIG. 10B, the width and depth of the intermediate annular groove 35b are smaller than the width and depth of each of the opposite annular grooves 35a and 35c, respectively.

Figure 11A:
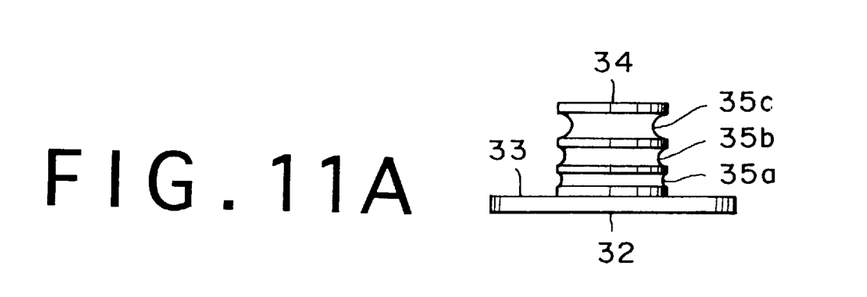
FIGS. 11A to 11D are elevational views showing still other different shapes of the annular grooves of the spacer.
Figure 11B:
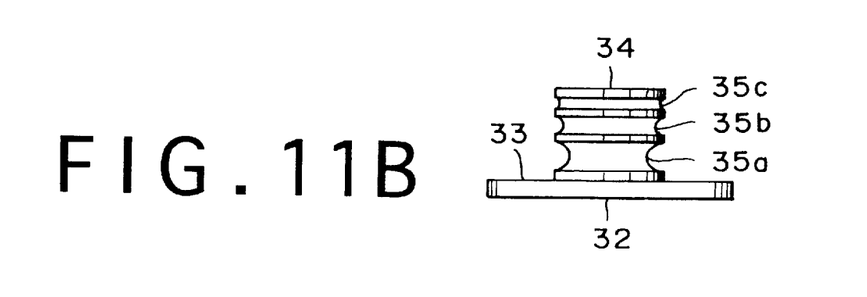

In the cylindrical projection 34 shown in FIG. 11A, the width and depth of the annular groove 35b are larger than the width and depth of the annular groove 35a, respectively, and the width and depth of he annular groove 35c are larger than the width and depth of the annular groove 35b, respectively. In the cylindrical projection 34 shown in FIG. 11B, the width and depth of the annular groove 35b are smaller than the width and depth of the annular groove 35a, respectively, and the width and depth of the annular groove 35c are smaller than the width and depth of the annular groove 35b, respectively.

Figure 11C:
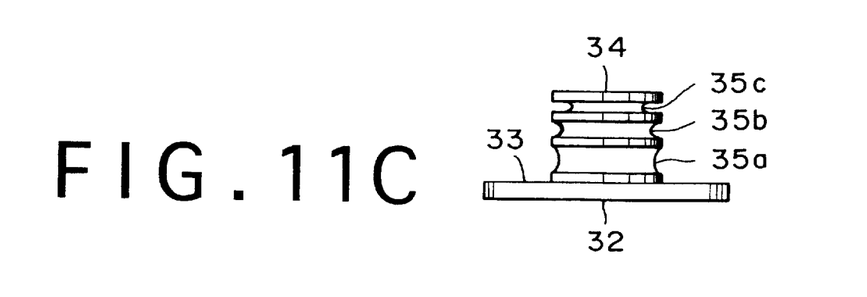
Figure 11D:
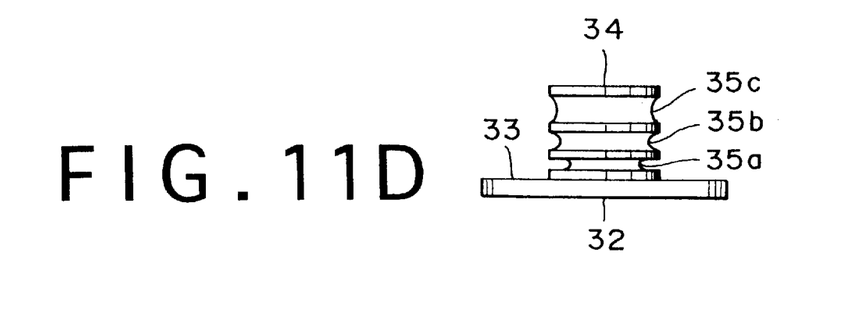

In the cylindrical projection 34 shown in FIG. 11C, the width of the annular groove 35b is smaller than the width of the annular groove 35a, and the width of the annular groove 35c is smaller than the width of the annular groove 35b, whereas the depth of the annular groove 35b is larger than the depth of the annular groove 35a, and the depth of the annular groove 35c is larger than the depth of the annular groove 35b. In the cylindrical projection 34 shown in FIG. 11D, the width of the annular groove 35b is larger than the width of the annular groove 35a, and the width of the annular groove 35c is larger than the width of the annular groove 35c, whereas the depth of the annular groove 35b is smaller than the depth of the annular groove 35a, and the depth of the annular groove 35c is smaller than the depth of the annular groove 35b.

Figure 12:
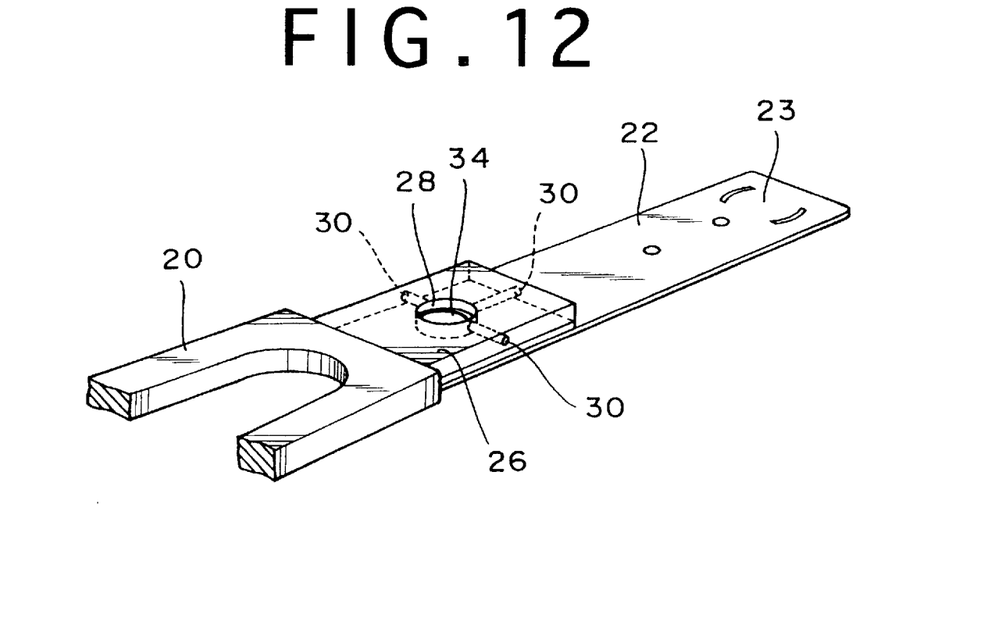
FIG. 12 is a perspective view of a second preferred embodiment of the present invention.

Referring to FIG. 12, there is shown a perspective view of an actuator arm assembly according to a second preferred embodiment of the present invention. In this preferred embodiment, the mounting portion 26 of the actuator arm 20 has three holes 30 for injecting an adhesive. By forming the plural holes 30, the adhesive injected can be uniformly spread over the annular gap defined between the outer circumferential surface of the cylindrical projection 34 and the wall surface defining the hole 28. Alternatively, one or two of the three holes 30 may be utilized as a hole or holes for confirming the adhesive. That is, whether the adhesive injected through the adhesive injecting holes or hole 30 has been fully spread can be confirmed by checking that the adhesive injected comes out of the adhesive confirming hole or holes 30.

Figure 13:
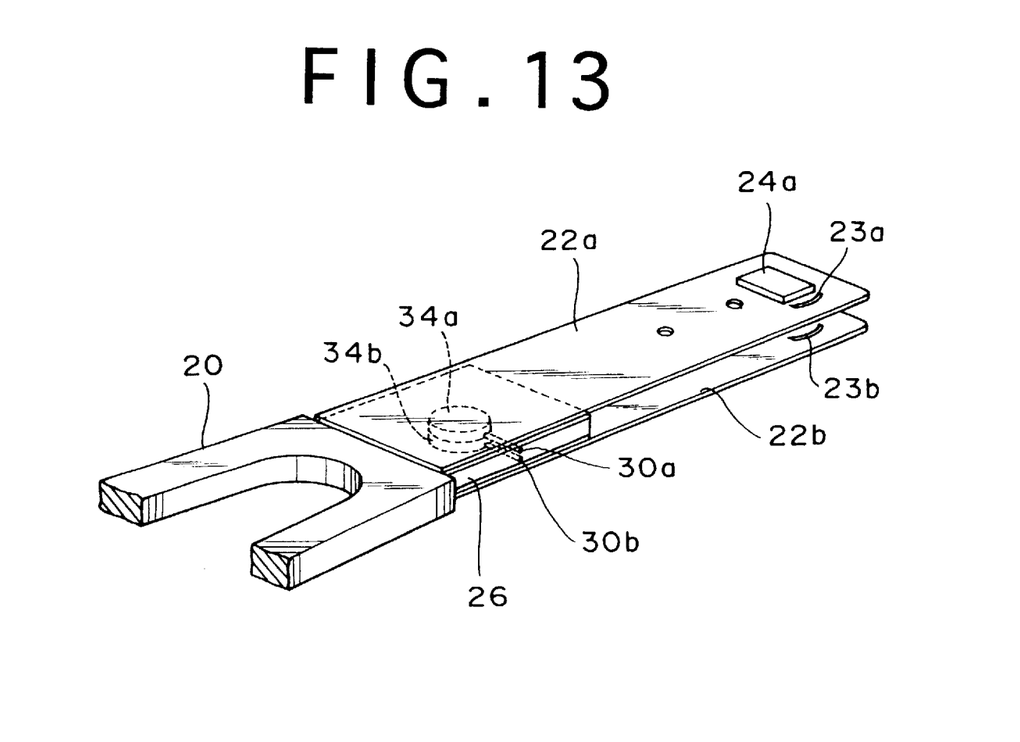
FIG. 13 is a perspective view of a third preferred embodiment of the present invention.

Referring to FIG. 13, there is shown an actuator arm assembly according to a third preferred embodiment of the present invention. In this preferred embodiment, an upper suspension 22a and a lower suspension 22b are fixed through similar cylindrical projections 34a and 34b to the upper and lower surfaces of the mounting portion 26 of the actuator arm 20, respectively. A magnetic head 24a is mounted on the upper surface of a flexure 23a of the upper suspension 22a. Similarly, a magnetic head (not shown) is mounted on the lower surface of a flexure 23b of the lower suspension 22b.

Two holes 30a and 30b for injecting an adhesive are formed in the mounting portion 26 of the actuator arm 20 so as to be exposed to one side surface of the mounting portion 26. The adhesive injected through the hole 30a is used mainly for fixing of the upper suspension 22a, and the adhesive injected through the hole 30b is used mainly for fixing of the lower suspension 22b.

Figure 14:
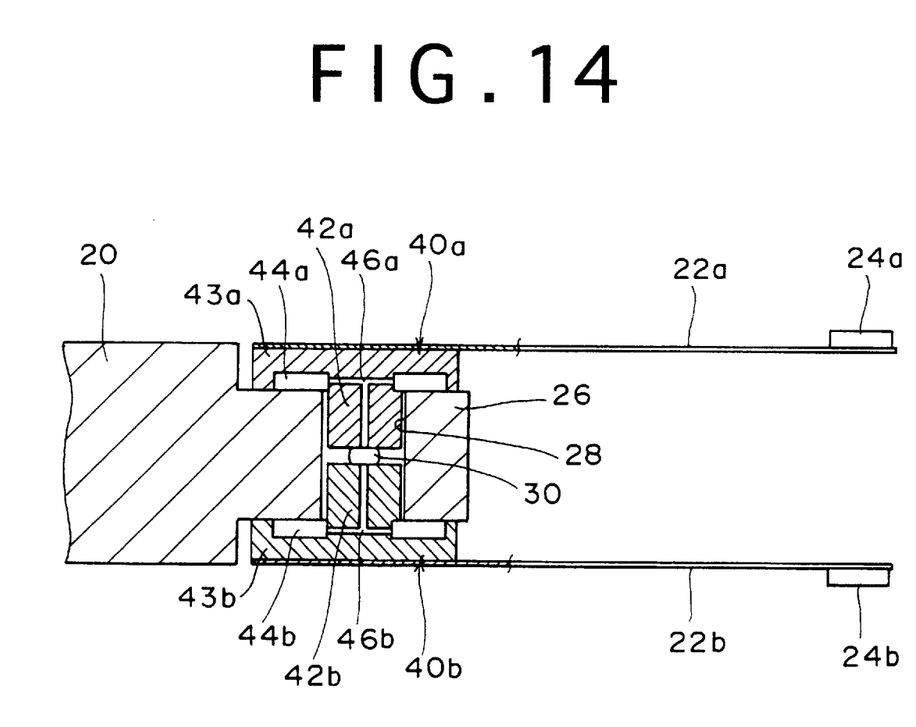
FIG. 14 is a sectional view of a fourth preferred embodiment of the present invention.

Referring to FIG. 14, there is shown a sectional view of an actuator arm assembly according to a fourth preferred embodiment of the present invention. A spacer 40a is spot-welded to a base end portion of an upper suspension 22a, and a spacer 40b is spot-welded to a base end portion of a lower suspension 22b. Magnetic heads, 24a and 24b, are mounted on the upper and lower suspensions, respectively. 40a and 40b have solid cylindrical projections 42a and 42b and flat plate portions 43a and 43b, respectively. The flat plate portions 43a and 43b are formed with annular grooves 44a and 44b facing the upper and lower surfaces of the mounting portion 26, respectively. The cylindrical projections 42a and 42b are formed with passages 46a and 46b communicating with the annular grooves 44a and 44b, respectively.

In fixing the upper suspension 22a and the lower suspension 22b to the mounting portion 26 of the actuator arm 20, the cylindrical projections 42a and 42b of the spacers 40a and 40b are inserted into the hole 28 of the mounting portion 26 from the upper and lower sides, respectively. Then, an adhesive is injected through the hole 30 of the mounting portion 26 into the hole 28. As a result, a part of the adhesive injected is spread over annular gaps defined between the outer circumferential surfaces of the cylindrical projections 42a and 42b and the wall surface defining the hole 28, and the remaining part of the adhesive injected is passed through the passages 46a and 46b of the cylindrical projections 42a and 42b to reach the annular grooves 44a and 44b. Thus, the annular grooves 44a and 44b closed by the upper and lower surfaces of the mounting portion 26 are filled with the adhesive injected. Accordingly, the upper suspension 22a and the lower suspension 22b can be firmly fixed to the mounting portion 26 of the actuator arm 20 by means of the adhesive injected.

Figure 15:
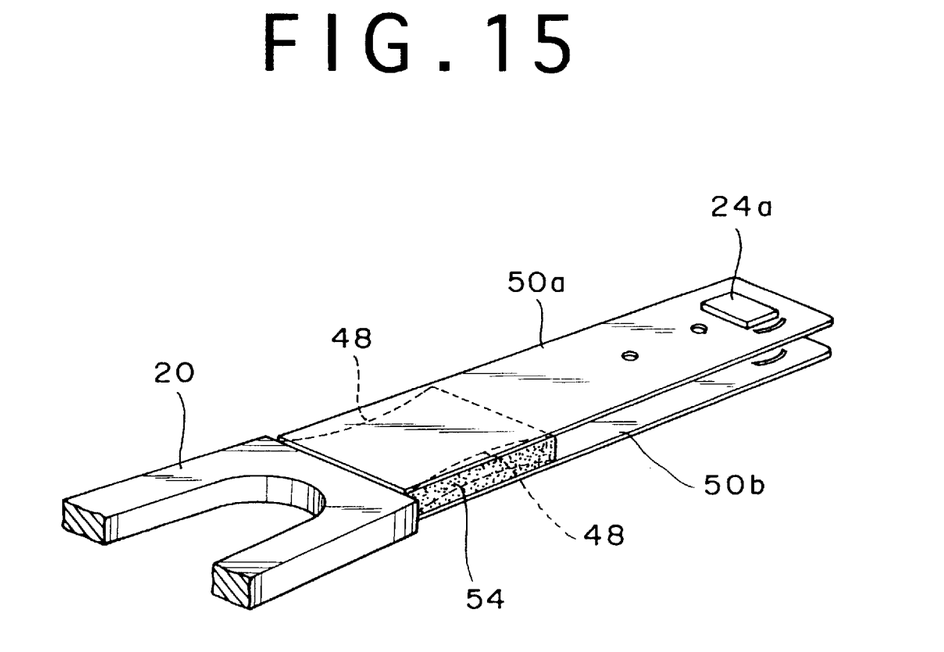
FIG. 15 is a perspective view of a fifth preferred embodiment of the present invention.
Figure 16:
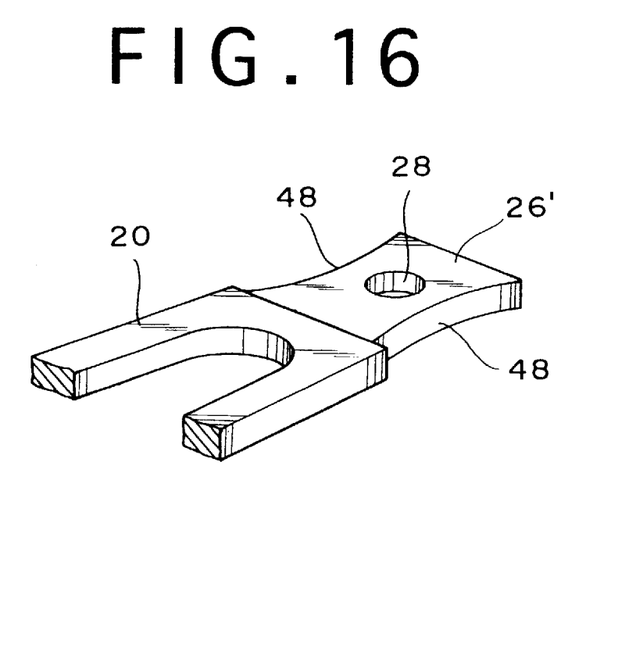
FIG. 16 is a perspective view of a front end portion of an actuator arm in the fifth Preferred embodiment.
Figure 17:
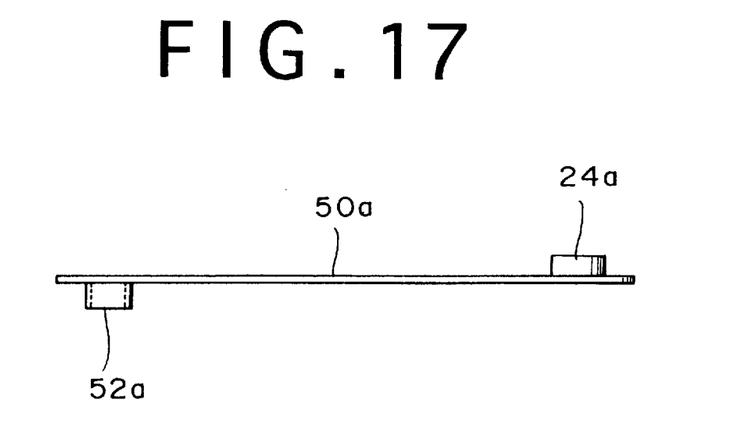
FIG. 17 is a side view of a suspension in the fifth preferred embodiment.

Referring to FIG. 15, there is shown an actuator arm assembly according to a fifth preferred embodiment of the present invention. As shown in FIG. 16, a mounting portion 26' of an actuator arm 20 in this preferred embodiment has a suspension fixing hole 28 and a pair of curved side surfaces 48. Each curved side surface 48 is formed as a substantially arcuately concaved surface. As shown in FIG. 17, a cylindrical projection 52a is formed integrally with the lower surface of an upper suspension 50a at its base end portion, and an upper head 24a is fixed to the upper surface of the upper suspension 50a at its front end portion. A lower suspension 50b has a configuration similar to that of the upper suspension 50a.

In fixing the upper suspension 50a and the lower suspension 50b to the mounting portion 26' of the actuator arm 20, the cylindrical projection 52*a* of the upper suspension 50*a* and the cylindrical projection (not shown) of the lower suspension 50*b* are inserted into the hole 28 of the mounting portion 26' from the upper and lower sides, respectively. Then, an adhesive 54 is applied to the curved side surfaces 48, thereby fixing the upper suspension 50*a* and the lower suspension 50*b* to the mounting portion 26' of the actuator arm 20.

According to one aspect of the present invention, the adhesive injecting hole is formed in the mounting portion of the actuator arm so as to be exposed to the side surface of the mounting portion, so that the suspension can be securely fixed to the mounting portion of the actuator arm by means of the adhesive injected through the hole of the mounting portion.

What is claimed is:

1. An actuator arm assembly of a disk drive having a base, comprising:

an actuator arm rotatably mounted on said base, said actuator arm having one end portion formed with a first hole and a second hole substantially perpendicular to said first hole and communicating with said first hole;

a suspension having one end portion for supporting a head; and a spacer fixed to the other end portion of said suspension, said spacer having a cylindrical projection inserted in said first hole and fixed to said one end portion of said actuator arm by means of an injected adhesive, said injected adhesive injected through said second hole into said first hole.

2. An actuator arm assembly according to claim 1, wherein said cylindrical projection has at least one annular groove.

3. A disk drive comprising:

a housing including a base and a cover fixed to said base;

a disk rotatably mounted in said housing and having a plurality of tracks;

a head for performing read/write of data on said disk; and a head actuator for moving said head across the tracks of said disk, said head actuator including an actuator arm assembly rotatably mounted on said base;

said actuator arm assembly comprising:

an actuator arm rotatably mounted on said base, said actuator arm having one end portion formed with a first hole and a second hole substantially perpendicular to said first hole and communicating with said first hole;

a suspension having one end portion for supporting said head; and a spacer fixed to the other end portion of said suspension, said spacer having a cylindrical projection inserted in said first hole and fixed to said one end portion of said actuator arm by means of an injected adhesive, said injected adhesive injected through said second hole into said first hole.

* * * * *

UNITED STATES PATENT AND TRADEMARK OFFICE
CERTIFICATE OF CORRECTION

PATENT NO. : 5,841,609
DATED : November 24, 1998
INVENTOR(S) : Kazunori Tochiyama It is certified that error appears in the above-identified patent and that said Letters Patent is hereby corrected as shown below:

Column 1, line 24, delete "forces" and insert --force-- therefor

Column 2, line 12, delete "th(e" and insert --the-- therefor

Column 3, line 15, delete "Preferred" and insert --preferred-- therefor

Column 6, line 26, before "40a" insert --The spacers-- therefor

Signed and Sealed this

Ninth Day of November, 1999

Attest:

Q. TODD DICKINSON

*Attesting Officer*     *Acting Commissioner of Patents and Trademarks*